United States Patent
Bowling et al.

(10) Patent No.: US 6,887,923 B2
(45) Date of Patent: May 3, 2005

(54) PROCESSING AIDS FOR ENHANCED MACHINE DIRECTION ORIENTATION RATES AND PROPERTY ENHANCEMENT OF POLYOLEFIN FILMS USING HYDROCARBON WAXES

(75) Inventors: Robert J. Bowling, Union, KY (US); D. Ryan Breese, Loveland, OH (US)

(73) Assignee: Equistar Chemicals, L.P., Houston, TX (US)

( * ) Notice: Subject to any disclaimer, the term of this patent is extended or adjusted under 35 U.S.C. 154(b) by 0 days.

(21) Appl. No.: 10/316,399

(22) Filed: Dec. 11, 2002

(65) Prior Publication Data

US 2004/0116584 A1 Jun. 17, 2004

(51) Int. Cl.$^7$ .......................... B29C 55/12; B29C 55/28
(52) U.S. Cl. .................. 524/62; 524/478; 524/479; 524/480; 524/488; 524/489; 524/487; 524/587; 525/240; 526/348.1; 428/910; 264/288.4; 264/435; 264/479
(58) Field of Search .......................... 524/62, 478, 479, 524/480, 487–489, 587; 525/240; 264/435, 479, 481, 288.4; 428/910; 526/348.1; 585/9

(56) References Cited

U.S. PATENT DOCUMENTS

| 4,704,238 A | 11/1987 | Okuyama et al. |
| 4,774,277 A | 9/1988 | Janac et al. |
| 4,870,122 A * | 9/1989 | Lu .............................. 524/488 |
| 5,378,747 A | 1/1995 | Willcox et al. |
| 6,092,554 A | 7/2000 | Pyle et al. |
| 2003/0040584 A1 | 2/2003 | Tate et al. |

FOREIGN PATENT DOCUMENTS

| EP | 0 310 290 A | 4/1989 |
| EP | 0 326 181 | 8/1989 |
| EP | 0 341 188 A | 11/1989 |
| EP | 0 539 026 A | 4/1993 |
| EP | 0 539 047 A | 4/1993 |
| JP | 57 023643 A | 2/1982 |
| WO | WO 94/06849 | 3/1994 |
| WO | WO 99/54400 | 10/1999 |

* cited by examiner

Primary Examiner—Roberto Rabago
(74) Attorney, Agent, or Firm—Brooks Hushman P.C.

(57) ABSTRACT

The present invention disclose a method for the orientation of a high density polyethylene ("HDPE") film. The process of the invention comprises forming a HDPE-wax mixture by adding to a HDPE batch a normally solid hydrocarbon wax. The HDPE-wax mixture is subsequently stretched into a film at an orientation temperature below the film's melt temperature. The hydrocarbon wax is characterized by having a drop point equal to or lower than the melting point of the HDPE film. The present invention also provides a film made by the process of the invention and a master batch thereof.

8 Claims, No Drawings

PROCESSING AIDS FOR ENHANCED MACHINE DIRECTION ORIENTATION RATES AND PROPERTY ENHANCEMENT OF POLYOLEFIN FILMS USING HYDROCARBON WAXES

BACKGROUND OF THE INVENTION

1. Field of the Invention

In at least one aspect, the present invention pertains to oriented film of high density polyethylene, to compositions suitable for the preparation thereof, and to a process for its preparation

2. Background Art

Polyethylene is available in numerous forms required of the various and distinct end uses for which it is destined. Polyethylene may be roughly divided into low density and high density grades. Within each grade, polyethylene may exhibit a variety of melt temperatures, melt flow ratios, melt viscosities, and the like. The physical properties of each type of polyethylene must be closely tailored to the specific end use; otherwise processing becomes problematic or even impossible. Thus, it is impossible, in general, to employ a polyethylene composition tailored for one type of processing in another type of processing. For example, low density polyethylene (LDPE) is widely used for preparation of films, and finds uses in such items as cargo wrap and plastic refuse bags. LDPE is relatively easy to formulate for such uses, and may contain numerous ingredients in addition to LDPE itself, i.e., pigments, UV absorbers, thermal stabilizers, plasticizers, lubricants, etc.

Oriented high density polyethylene (HDPE) is an altogether different product, and is formulated differently than its LDPE relative. By orienting HDPE, the barrier, the strength and stiffness properties are markedly improved. As a result, stronger, and optionally thinner films may be prepared. The higher density and, in general, different physical properties of HDPE require different processing considerations, and orientation adds additional complexity. Oriented HDPE is generally extruded as a film, which may be water quenched, chill roll cast, or blown and air quenched. The film is then uniaxially or biaxially stretched, optionally followed by annealing. The stretching operation takes place below the melt temperature, and may be termed a "hot stretch." The stretching operation must take place without any substantial likelihood of breakage, as breakage requires that the entire orientation process be restarted, increasing process down-time and greatly increasing cost.

A variety of different types of HDPE may be successfully oriented as film, and such HDPE is commercially available. However, oriented film produced from such compositions is not necessarily optimal for certain applications, and thus improvements in HDPE oriented film are desirable. Moreover, up till now, solution processed HDPE has proven to be extremely difficult to prepare as oriented film. Solution-polymerized HDPE is prepared by polymerizing ethylene in solution, following which the solvent is removed and the polymer is pelletized. Solution-polymerized HDPE tends to stretch inconsistently, and thus the rate and/or amount of stretch must be decreased in order to orient the film without breaking, if orientation can be performed at all. Decreasing the amount of stretch generates a product having different and generally less desirable physical properties, while decreasing the rate of stretch results in increased production time and cost.

SUMMARY OF THE INVENTION

Against this prior art background, the present invention discloses a process for the orientation of a high density polyethylene film. The process of the invention comprises forming a HDPE-wax mixture by adding to a HDPE batch a normally solid hydrocarbon wax in an amount of from 0.02 weight percent to about 1.0 weight percent of the combined weight of the HDPE batch and the hydrocarbon wax. Moreover, the HDPE-wax mixture as used in practicing the invention is substantially free of filler such that filler-created microvoids are substantially avoided. The HDPE-wax mixture is subsequently stretched into a film at an orientation temperature below the film's melt temperature. The hydrocarbon wax is characterized by having a drop point (i.e., a drop point range) equal to or lower than the melting point of the HDPE film.

In another embodiment of the present invention, an oriented HDPE film made by the process set forth above is provided. The HDPE film comprises HDPE having a density from 0.930 to 0.965 g/cm3, and a hydrocarbon wax in an amount of about 0.02% to about 1% of the weight of the HDPE film. The hydrocarbon wax is characterized as having a drop point below the melting point of the HDPE film.

In still another embodiment of the present invention, a master batch for use in the method of the present invention is provided. The master batch comprising HDPE or a mixture of HDPE and another polyethylene homo- or co-polymer of lower density, and from 1 to about 6 weight percent of a normally solid hydrocarbon wax having a drop point less than 170° C.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

The term "drop point" as used herein refers to the temperature at which a solid petroleum products attains a certain degree of fluidity when tested in accordance to ASTM D-127. Drop point is typically used in place of melting point since these petroleum products typically do not exhibit a sharp melting point. Drop point is generally recorded as a temperature range.

The term "hydrocarbon wax" as used herein refers to hydrocarbons of high molecular weight, including but not limited to, mineral waxes, such as paraffin wax which is obtained from petroleum. All so included in this definition are micro-crystalline waxes as defined below.

The term "micro-crystalline wax" as used herein refers to a type of paraffin wax in which the crystals are very small. Typically, such waxes are obtained by solvent extraction from various petroleum residues.

The term "hydrocarbon" as used herein refers compounds containing only carbon and hydrogen.

In an embodiment of the present invention, a process for the orientation of a high density polyethylene (HDPE) film is provided. The process of the invention comprises forming a HDPE-wax mixture by adding to HDPE a normally solid hydrocarbon wax in an amount of from 0.02 weight percent to about 1.0 weight percent. These weight percents are based on the sum of the weights of HDPE and the hydrocarbon wax. Moreover, the HDPE-was mixture as used in practicing the invention is substantially free of filler such that filler-created microvoids are substantially avoided. The HDPE-wax mixture is subsequently stretched into a film at an orientation temperature below the film's melt temperature. The hydrocarbon wax is characterized by having a drop point (i.e., the drop point range) equal to or lower than the melting point of the HDPE film. Moreover, the hydrocarbon wax also has a drop point equal to or lower than the drop point of the HDPE film. More preferably, the hydrocarbon wax is characterized by having a drop point equal to or lower than the orientation temperature of the HDPE film. The orientation temperature of the HDPE film may be up to just less than the melt temperature of the film. The melting point of the film can be as high as about 170° C. However, generally the orientation temperature (and the melting point of the film) is about 130° C. Preferably, the orientation temperature is below about 125° C. More preferably, the orientation temperature is in the range of about 80° C. to about 120° C., and most preferably about 100° C. to about 115° C. Accordingly, the hydrocarbon wax has a drop point typically below about 170° C. Preferably, the hydrocarbon wax has a drop point from about 60° C. to about 130° C. More preferably, the hydrocarbon wax has a drop point from about 90° C. to about 120° C.; and most preferably about 115° C.

The HDPE batch used in the present invention comprises HDPE as conventionally recognized as HDPE by the skilled artisan, i.e., polyethylene homopolymers or copolymers having a density of from 0.930 to 0.965. In general, copolymeric HDPE contains 20 weight percent or less, particularly 10% by weight or less of copolymerizable comonomers. Suitable comonomers are well known in the art, with preferred comonomers being butene, hexene, and octene. The polyethylene may be made by conventional catalysts, i.e., of the Ziegler-Natta type, chromium type, or may be made employing a wide variety of single site catalysts, for example STAR™ ethylene polymerization catalysts developed by EQUISTAR, Cincinnati, Ohio. Processes for preparing HDPE include all those in common use, including gas phase, slurry, and solution processes. Solution processed polyethylene is the preferred polyethylene in the present application. The resultant polyethylene, optionally including thermal and/or UV stabilizers, is commonly extruded and pelletized to form a polyethylene "raw material".

The HDPE polyethylene raw material is extruded through a die into film. Prior to or while in the extruder, the HDPE raw material is compounded with any additional ingredients, generally including dyes and/or pigments, thermal and/or UV stabilizers, slips, antiblock, etc. These may be dosed into the extruder by themselves, or in master batches of a polyolefin, such are HDPE, LDPE and polypropylene, containing larger than desired amounts of additives. Alternatively, master batches containing the desired ingredients may be mixed in the appropriate proportions with the HDPE raw material prior to entry into the extruder. The HDPE preferably contains no fillers, especially fillers which would cause disruption of the film such as the formation of voids.

In the present invention, the ability to stably orient extruded polyethylene films is induced or augmented by the addition of a small quantity of a normally solid hydrocarbon wax, one having a drop point below the film orientation temperature, preferably the hydrocarbon wax has a molecular weight from about 500 to about 5000. Preferred hydrocarbon waxes are polyethylene waxes, polypropylene waxes, micro-crystalline waxes, and mixtures thereof. More preferably, the hydrocarbon wax has a molecular weight from about 1000 to about 4000, and most preferably about 3000. While the hydrocarbon waxes may contain ethylenic unsaturation, they must be normally solid, i.e. solid at 25° C. The preferred hydrocarbon waxes are saturated hydrocarbon waxes described by Formula I or branched isomers of Formula I:

$$CH_3(CH_2)_nCH_3 \qquad \qquad I$$

where n is from about 30 to about 360. Suitable hydrocarbon waxes include, but are not limited to, Licowax PE 130, Licowax PE 190, Licowax PE 810, Licowax PE 820, Licowax PE 830, and Licowax PE 840, also of which are commercially available from Clariant.

The manner in which the normally solid, low melting hydrocarbon wax functions is not known with certainty. Without wishing to be bound to any particular theory, it is presently believed that the long chain hydrocarbon waxes, having a structure similar to polyethylene, are able to be homogeneously dispersed in the polyethylene, where it functions to allow greater mobility between adjacent polyethylene polymer chains. The greater mobility is thought to reduce the inconsistencies otherwise associated with the orientation of polyethylene polymers.

The amount of solid, hydrocarbon wax is an amount effective to allow orientation without undue breakage or draw resonance (tiger striping), while maintaining desirable end properties. The actual amount is dependent to some degree on the particular HDPE, and thus may vary. However, the amount is virtually always less than 1% of the total weight of the hydrocarbon wax and the HDPE. More preferably, the hydrocarbon wax is present in an amount from about 0.02% to 1% of the combined weight of the hydrocarbon wax and the HPPE; and most preferably from about 0.05% to 0.5% of the combined weight of the hydrocarbon wax and the HDPE. It should be noted that in addition to facilitating orientation, many of the properties of the oriented film are improved as well.

The solid, hydrocarbon wax is preferably supplied as a master batch, dispersed in the same or another HDPE. In certain circumstances, LDPE, LLDPE or other polyethylene homopolymers or copolymers may be introduced as well. Preferred master batches contain a hydrocarbon wax at a level of from 1 weight percent to 10 weight percent, preferably 3 weight percent to 8 weight percent, and most preferably 4 to 6 weight percent. The hydrocarbon wax is the same as set forth above for the process and HDPE film of the present invention. The polyethylene used in the master batch may be the same or different from the polyethylene to which the master batch will be added, but is preferably the same or substantially similar. Suitable base resins include, but are not limited to, the Alathon® polyethylene resins manufactured by Equistar Corporation, including L5845 with a melt index of 0.45 and density of 0.958 g/cm$^3$; L5045, with a melt index of 0.45 and a density of 0.950 g/cm$^3$; LT618072, with a melt index of 1.0 and a density of 0.960 g/cm$^3$; PE4829, with a melt index of 0.34 and a density of 0.944 g/cm$^3$; and L5885 with a melt index of 0.85 and a density of 0.958 g/cm$^3$.

The master batches are generally prepared conventionally in a single screw or twin screw extruder, although other devices such as Henschel mixers, Banbury mixers, Brabender mixers and other mixers may also be used. The hydrocarbon wax is generally mixed in at relatively low shear, and thus for a resin with a melt temperature below 285° F. (140° C.), temperatures of 360° F. (182° C.) to 400° F. (204° C.) are suitable, although higher or lower temperatures may be used as well. It is most desirable to compound the master batch a temperature below the smoke point of the wax. Following mixing, the master batch is generally granulated or pelletized.

The master batch is added to the desired HDPE in an amount sufficient to provide the necessary resistance to breaking and stretch resonance during film orientation, for example 2,000 ppm relative to the final HDPE product. The HDPE is extruded into film and generally quenched by conventional processing methods, i.e. by chill rolls, air quenching, water quenching, etc. Following film preparation, the film may optionally be slit, i.e., for forming tape, and is uniaxially or biaxially oriented. The orientation takes place at a temperature which is preferably above the line drawing temperature, and below the melt temperature. If necking can be tolerated, lower temperatures may be used.

The term "line drawing temperature" refers to the temperature above which uniform orientation is obtained, as is known in the art. The line drawing temperature and melting temperature can be determined experimentally. When the film is stretched at temperatures low enough for line drawing, a "line" or "neck" develops in the film, perpendicular to the direction of stretch once the yield point has been reached. Stretching then starts from this thinned-out region until an elongation equal to the natural stretch ratio of the film is achieved, for the particular stretch rate used. If a series of film samples is stretched under conditions of line-drawing at a set of increasingly higher temperatures, starting at room temperature, a series of decreasingly sharp maxima will result in the corresponding stress-strain curves. At some higher temperature, a maximum no longer appears in the stress-strain curve, and line drawing has ceased. At this temperature or higher temperatures, the film undergoes more uniform stretching over its length and no longer displays a line or neck during elongation.

The line-drawing temperature can change. For example, a film has a given line drawing temperature before stretching. However, after stretching in one direction, e.g., the machine direction, the line-drawing temperature of the film in the direction perpendicular to the direction of stretch, e.g., the transverse direction, is higher than the given temperature. This difference in temperatures should be taken into consideration in order to provide biaxial stretching at the proper stretching temperature when stretching in the machine direction and transverse stretching are not performed simultaneously.

The stretching may occur in conventional devices, i.e., between a series of pairs of counter-rotating rollers, the temperature of which may vary from roll-to-roll. The initial pair of counter-rotating rollers revolve at a lower rate than the last pair, or "exit rollers," with pairs of rollers inbetween revolving at intermediate rates. Thus, the exit speed of the film is higher than the input speed and the film is stretched accordingly. The term "stretch ratio" is the ratio of a length of a sample of the film in the orientation direction, after stretching, compared to the original length of the film in the orientation direction, before stretching. The "stretch rate" is the rate of change in length of the stretched film over time. The stretch ratio may be adjusted to the desired level, i.e., one which achieves the desired tensile strength, generally a stretch ratio between 2 and 25, more preferably between 3.0 and 8.0, and most preferably in the range of 5 to 7, by increasing the relative differences in revolving rates of the input and exit rollers.

The optimum temperature for stretching will depend on the particular polyethylene or blend of polyethylenes selected. As indicated, when stretching the films, it is necessary for the film temperature to be below the melt temperature point and above the line drawing temperature. In practice, the actual sheet or film temperature is not usually measured. Instead, what is measured is, for example, the temperature of the fluid used to heat orienting rolls in a machine direction orienter, or the air temperature in a tenter frame oven.

For example, the rollers may be contained within a stretch oven, which is preferably maintained at a temperature above the melt temperature of the polyethylene. Because of the speed of travel of the web through the oven, however, the film temperature never rises above the melt temperature, and thus the stretching takes place in the solid state. The melting point of the film can be as high as 170° C. However, generally the orientation temperature (and the melting point of the film) is about 130° C. Preferably, the orientation temperature is below about 125° C. More preferably, the orientation temperature is in the range of about 80° C. to about 120° C., and most preferably about 100° C. to about 115° C. Accordingly, the hydrocarbon wax has a drop point typically below about 170° C. Preferably, the hydrocarbon wax has a drop point from about 60° C. to about 130° C. More preferably, the hydrocarbon wax has a drop point from about 90° C. to about 120° C.; and most preferably about 115° C.

If biaxial orientation is desired, the film is not slit prior to stretching (but optionally may be slit afterwards), and enters the oven in a tenter frame. A series of clamp-like devices clamp onto the edges of the film and move apart relative to each other both in the transverse and lateral directions. The film is thus stretched both across its width (transverse) and along its length (laterally). The stretch ratio may be the same or different in these directions. A combination of roller stretching (monoaxial) and transverse stretching in a tenter frame may also be employed, or any combination. Following stretching, whether monoaxial or biaxial, the resulting film or tape is optionally annealed in the annealing oven. Following exit from the optional annealing oven, the product may be wound onto rolls or bobbins (i.e., for tape), may be woven, and/or laminated to other films. The tape may be woven into woven products. The oriented product has high tensile strength due to the stretching operation below the melt temperature, and is a coherent product, for example exhibiting a lack of microvoids.

Having generally described this invention, a further understanding can be obtained by reference to certain specific examples which are provided herein for purposes of illustration only and are not intended to be limiting unless otherwise specified.

EXAMPLE 1

A master batch of 5 weight percent LDPE based wax with a molecular weight of about 1,000 and a drop point between about 110° C. and 115° C. in a solution-type polyethylene homopolymer (Alathon™ L5885 polyethylene) with a melt index of 0.85 and a density of 0.958 is prepared by mixing the ingredients under low shear at 330° F. to 400° F. until a homogenous product is obtained. To optimize homogeneity, the polyethylene homopolymer may be ground to a granule or powder. The master batch is then extruded and pelletized. Films of Alathonâ L5885 polyethylene based resin with and without the LDPE based wax derived from the master batch are air blown and quenched. The films are prepared with a stretch ratio of 6:1.

EXAMPLE 2

A master batch of 5 weight percent LDPE based wax with a molecular weight of 1,000 and a drop point between 110° C. and 115° C. in a solution-type polyethylene homopolymer (Alathon™ L5885 polyethylene) with a melt index of 0.85 and a density of 0.958 is prepared by mixing the ingredients under low shear at 330° F. to 400° F. until a homogenous product is obtained. To optimize homogeneity, the polyethylene homopolymer may be ground to a granule or powder. The master batch is then extruded and pelletized.

Films of Alathon® L5885 polyethylene based resin with and without the LDPE based wax derived from the master batch are cast and quenched. The films are prepared with a stretch ratio of 6:1.

EXAMPLE 3

A master batch of 5 weight percent HDPE based wax with a molecular weight of 3,000 and a drop point between 127° C. and 132° C. in a solution-type polyethylene homopolymer (Alathon™ L5885 polyethylene) with a melt index of 0.85 and a density of 0.958 is prepared by mixing the ingredients under low shear at 330° F. to 400° F. until a homogenous product is obtained. To optimize homogeneity, the polyethylene homopolymer may be ground to a granule or powder. The master batch is then extruded and pelletized. Films of Alathon® L5885 polyethylene based resin with and without the HDPE based wax derived from the master batch are air blown and quenched. The films are prepared with a stretch ratio of 6:1.

EXAMPLE 4

A master batch of 5 weight percent HDPE based wax with a molecular weight of 3,000 and a drop point between 127° C. and 132° C. in a solution-type polyethylene homopolymer (Alathon™ L5885 polyethylene) with a melt index of 0.85 and a density of 0.958 is prepared by mixing the ingredients under low shear at 330° F. to 400° F. until a homogenous product is obtained. To optimize homogeneity, the polyethylene homopolymer may be ground to a granule or powder. The master batch is then extruded and pelletized. Films of Alathon® L5885 polyethylene based resin with and without the HDPE based wax derived from the master batch are cast and quenched. The films are prepared with a stretch ratio of 6:1.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process forming an oriented high density polyethylene (HDPE) film, the process comprising:

forming a HDPE wax mixture by adding to HDPE a normally solid hydrocarbon wax having a molecular weight from about 1000 to about 4000 in an amount of from 0.02 weight percent to about 1.0 weight percent, said weight percents based on the sum of the weights of HDPE and the hydrocarbon wax, said HDPE being substantially free of filler such that filler-created microvoids are substantially avoided; and stretching the HDPE wax mixture into a film at an orientation temperature below the film's melt temperature, wherein the hydrocarbon wax has a drop point lower than the melting point of the HDPE film.

2. The process of claim 1 wherein the hydrocarbon waxes are polyethylene waxes, polypropylene waxes, microcrystalline waxes, and mixtures thereof.

3. The process of claim 1, wherein said hydrocarbon wax is selected from hydrocarbon waxes having drop points below 170° C.

4. The process of claim 1 wherein said hydrocarbon wax is selected from hydrocarbon waxes having drop points between 60° C. and 170° C.

5. The process of claim 1, wherein said hydrocarbon wax has a molecular weight of about 3000.

6. The process of claim 1 wherein said hydrocarbon wax is described by Formula I or branched isomers of Formula I:

$$CH_3(CH_2)_nCH_3 \qquad I$$

where n is from about 30 to about 360.

7. The process of claim 1, wherein said orientation temperature is below 130° C.

8. The process of claim 1, wherein said orientation temperature is below 115° C.

* * * * *